United States Patent [19]
Sung et al.

[11] Patent Number: 5,999,392
[45] Date of Patent: Dec. 7, 1999

[54] RESET CIRCUIT WITH TRANSIENT DETECTION FUNCTION

[75] Inventors: Yu-Yu Sung; Ming-Dou Ker, both of Hsinchu, Taiwan

[73] Assignee: Industrial Technology Research Institute, Hsinchu, Taiwan

[21] Appl. No.: 09/105,327

[22] Filed: Jun. 26, 1998

[51] Int. Cl.$^6$ ........................................... H02H 9/00
[52] U.S. Cl. .............................. 361/111; 361/56; 361/71; 361/118
[58] Field of Search .................. 361/56, 111, 115, 361/117, 118, 119, 90, 91, 92, 71, 72

[56] References Cited

U.S. PATENT DOCUMENTS 4,379,240  4/1983  Mammano .......................... 307/356

*Primary Examiner*—Stephen W Jackson
*Attorney, Agent, or Firm*—W. Wayne Liauh

[57] ABSTRACT

The invention relates to an automatic reset circuit for detecting much faster transient voltage variation between the supply voltage (VDD) and the electric ground (GND) of an electric system with noise and disturbance. The automatic reset circuit of the invention includes a plurality of detecting units, a plurality of voltage-couple devices connected with the detecting units, and a decision unit with an output port. The decision unit and the voltage-couple devices are also connected. The automatic reset circuit of the invention can detect nanosecond transient voltage variation between the supply voltage and the electric ground, and a reset is then enabled for protecting the inner circuits and surviving the normal operations of the electric system.

18 Claims, 3 Drawing Sheets

RESET CIRCUIT WITH TRANSIENT DETECTION FUNCTION

BACKGROUND OF THE INVENTION

1. Field of the Invention

This invention relates to an automatic reset circuit, especially to a reset circuit with transient detection function for detecting transient variations of the supply voltage (VDD) and the electric ground (GND) of an electric system.

2. Description of Related Art

Today, electric systems are greatly used in our daily life such as in televisions, computers, receivers, air conditioners, and mobile phones. Noise and disturbance are thus introduced in our environment, and they can heavily damage the inner circuits and normal functions of electric systems. Rippled supply voltages (VDD) of power sources and the voltage-level bias of an electric ground (GND) are very common and dangerous events in electric systems. These events always cause electric systems to experience improper operations, devices or circuit break, and system halt. Hence, it is the major objective of reset circuits in electric systems to protect their inner circuits and survive their normal operations. A commonly used reset circuit of the prior art is a manual reset device such as an electric switch., but it is manually enabled by experienced users. FIG. 1 is an automatic reset circuit of the prior art, which is commonly used in many integrated circuits. The automatic reset circuit includes a detecting unit 14, a resistor 12, a capacitor 13, and a trigger circuit 15 connected to the detecting unit 14. One end of the resistor 12 is connected to a supply voltage port 10 of a power source, and the other end of the resistor 12 is linked with one end of the capacitor 13 and the input port 141 of the detecting unit 14 to form a note 16. The other end of the capacitor 13 is joined with an electric ground 11. If the voltage variation between the supply voltage port 10 of the power source and the electric ground 11 exceeds the threshold of the detecting unit 14, the trigger circuit 15 is enabled. The automatic reset circuit of an electric system of the prior art usually detects the DC-level or low-frequency voltage variations in of the power source to reset the electric system automatically when the power source is turned on. In general, the rise time of the automatic reset circuit of the prior art is not faster than one microsecond ($\mu$s). However, the automatic reset circuit of the prior art is not sufficient to detect a nanosecond transient voltage variation in the system-level electrostatic discharge (ESD) test of an circuit board, the electrical fast transient/burst (EFT) test of a power line, and the automatic resetting and voltage compensating objectives of an complex electric system such as a VLSI system. A new automatic reset circuit is indeed required to detect much faster transient voltage variation of an electric system.

SUMMARY OF THE INVENTION

The objective of the invention is to provide an automatic reset circuit with transient detection function for detecting much faster transient voltage variations between the supply voltage and the electric ground of an electric system with noise and disturbance.

With solving the problem of the prior art reset circuits in mind, the automatic reset circuit of the invention includes a plurality of detecting units, a plurality of voltage-couple devices connected with the detecting units, and a decision unit with an output port, which is also connected with the voltage-couple devices. The automatic reset circuit of the invention can detect nanosecond transient voltage variation between the supply voltage and the electric ground, and a reset is then enabled for protecting the inner circuits and surviving the normal operations of the electric system.

BRIEF DESCRIPTION OF THE DRAWINGS

Other objects, features, and advantages of the invention will become apparent from the following detailed description of the preferred but non-limiting embodiment. The description is made with reference to the accompanying drawings in which:

FIG. 3-1 is the diagram of the first detecting unit with reset function in FIG. 2;

FIG. 3-2 is the diagram of the second detecting unit with reset function in FIG. 2;

FIG. 3-3 is the diagram of the third detecting unit with set function in FIG. 2; and FIG. 3-4 is the diagram of the forth detecting unit with set function in FIG. 2.

DETAILED DESCRIPTION OF THE INVENTION

Figure 1:
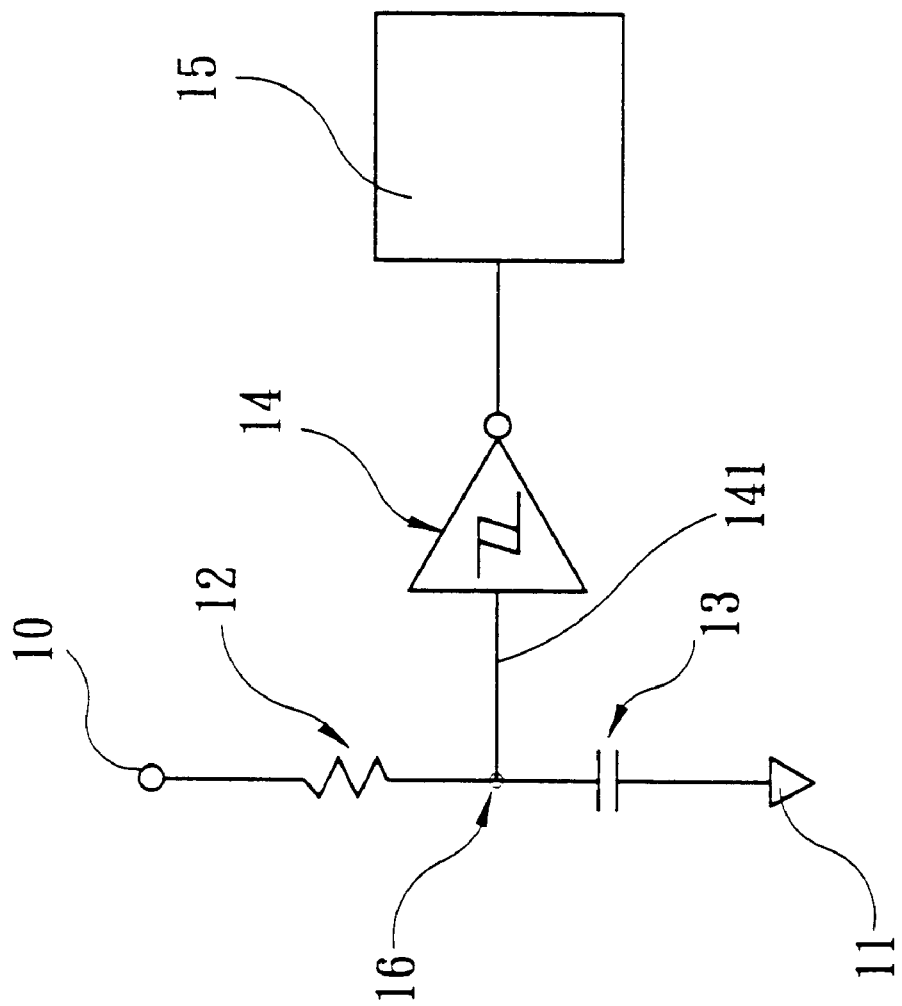
FIG. 1 is the diagram of a reset circuit of the prior art.
Figure 2:
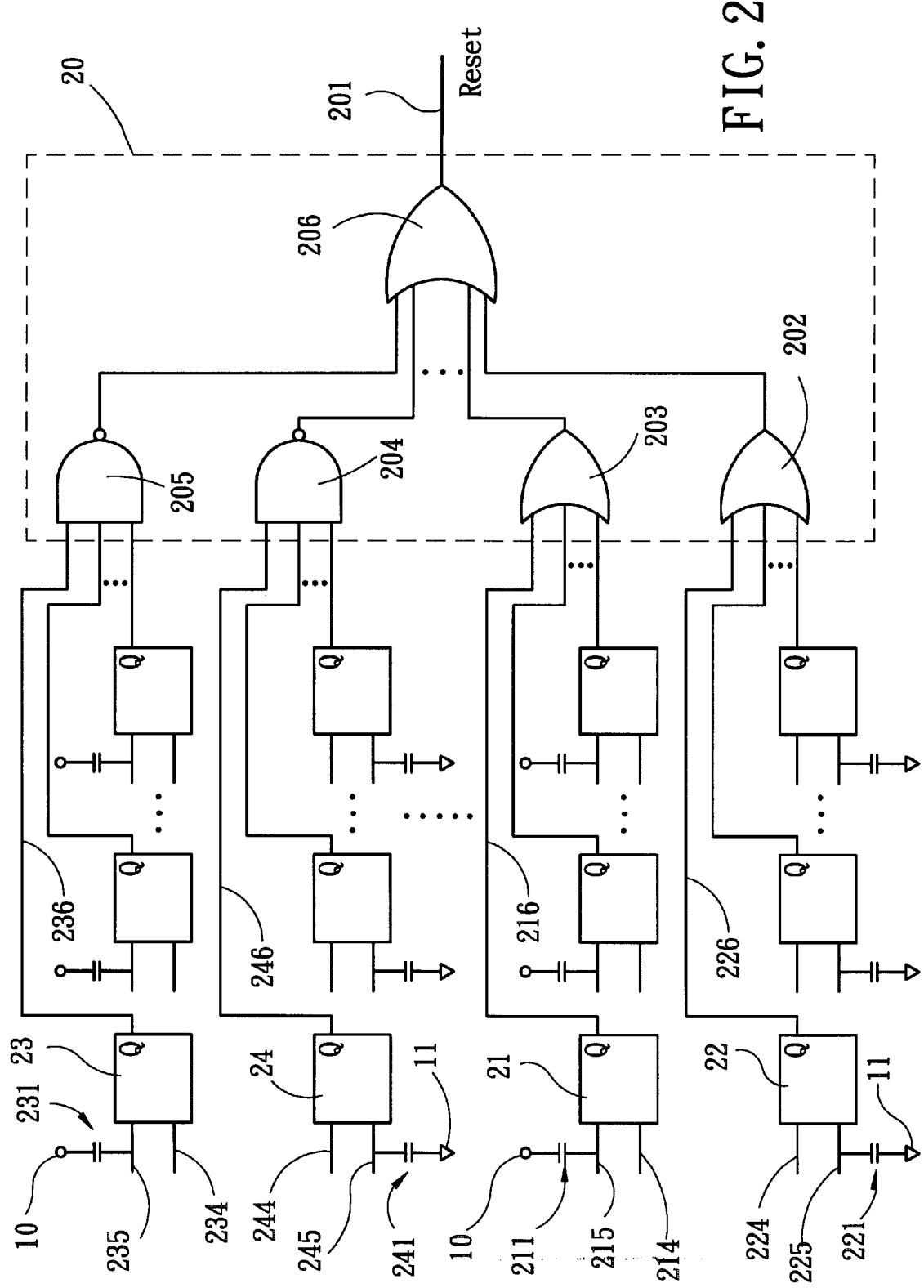
FIG. 2 is the diagram of an automatic reset circuit with transient detection function of the present invention.
Figures 2, 3:
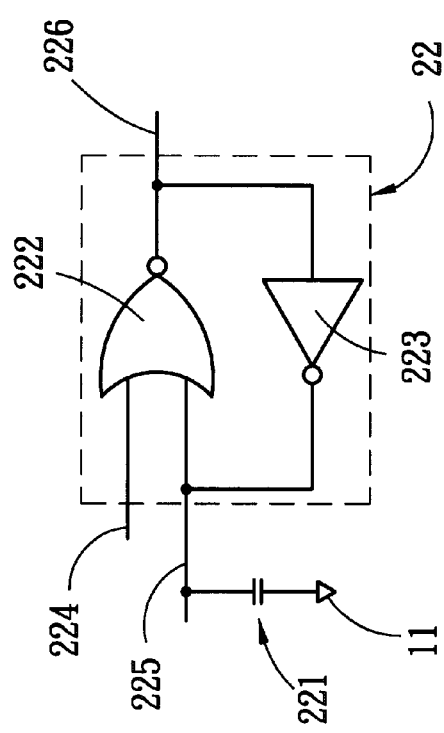
Figures 3, 4:
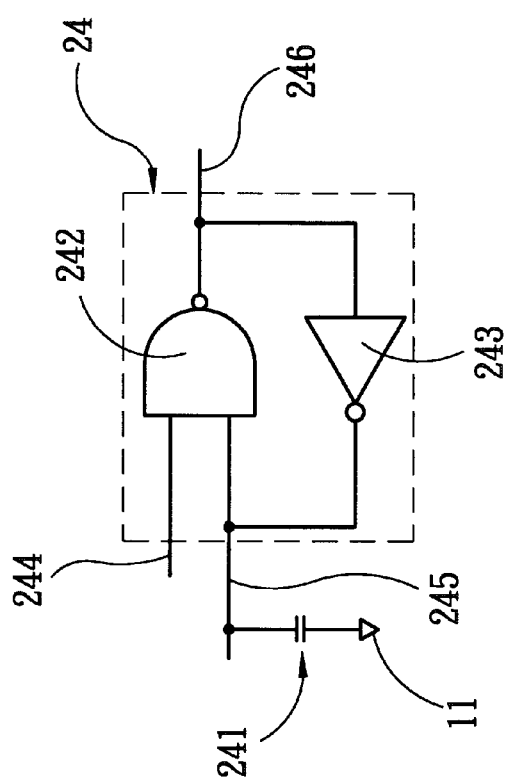
Figures 1, 3:
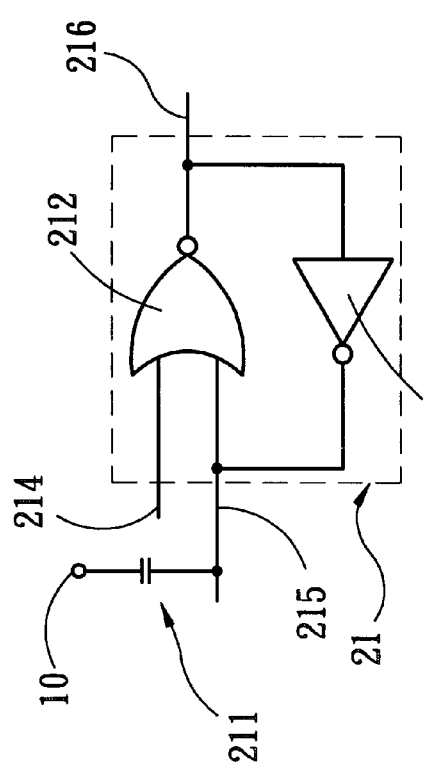
Figure 3:
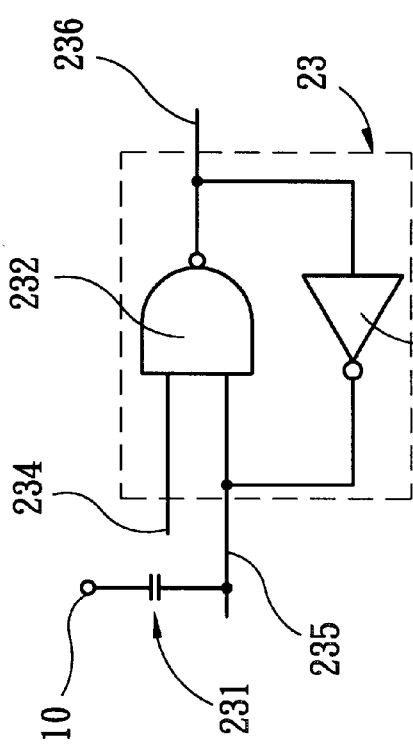

Please refer to FIG. 2, which is an automatic reset circuit with transient detection function for detecting transient voltage variation of an electric system induced by noise and disturbance. The reset circuit includes a plurality of the first detecting units 21, a plurality of the second detecting units 22, a plurality of the third detecting units 23, a plurality of the forth detecting units 24, a first voltage-couple device 211, a second voltage-couple device 221, a third voltage-couple device 231, a forth voltage-couple device 241, and a decision unit 20. The first detecting units 21 and the second detecting units 22 have reset functions, and the third detecting units 23 and the forth detecting units 24 have set functions. All voltage-couple devices 211, 221, 231, and 241 have two terminals, and they are coupling capacitors in this preferred embodiment. FIG. 3-1, 3-2, 3-3, and 3-4 show the detailed diagrams of the first detecting unit 21, the second detecting unit 22, the third detecting unit 23, and the forth detecting unit 24, respectively. The first detecting unit 21 consists of a NOR gate 212 with two inputs 214 and 215, and a NOT gate 213 where the output of the NOR gate 212 is linked with the input of the NOT gate 213, and the input 215 of the NOR gate 212 is connected with the output of the NOT gate 213 and one terminal of the first voltage-couple device 211. The other terminal of the first voltage-couple device 211 is linked to the supply voltage port 10. Similarly, the second detecting unit 22 consists of a NOR gate 222 with two inputs 224 and 225, and a NOT gate 223 with the similar connections as the first detecting units 21. The terminal of the second voltage-couple device 221 apart from the input 225 is linked to the electric ground 11. The third detecting unit 23 consists of a NAND gate 232 with two inputs 234 and 235, and a NOT gate 233 where the output of the NAND gate 232 linked with the input of the NOT gate 233, and the input 235 of the NAND gate 232 is connected with the output of the NOT gate 233 and one terminal of the third voltage-couple device 231. The other terminal of the third voltage-couple device 231 is connected to the supply voltage port 10. Similarly, the forth detecting unit 24 consists of a NAND gate 242 with two inputs 244 and 245, and a NOT gate 243 with the similar connections as the third detecting units 23. The terminal of the forth voltage-couple device 241 apart from the input 245 is linked to the electric ground 11. In addition, the detecting units 21, 22, 23, and 24 respectively possess their detect output ports 216, 226, 236, 246, and it is noted that the detecting units 21, 22, 23, and 24 of the invention are indeed latch circuits for latching their output at some levels. In FIG. 2, the decision unit 20 includes an OR gate 203 with its inputs connected to the detect output ports 216 of the first detecting units 21, an OR gate 202 with its inputs connected to the detect output ports 226 of the first detecting units 22, a NAND gate 205 with its inputs connected to the detect output ports 236 of the first detecting units 23, a NAND gate 204 with its inputs connected to the detect output ports 246 of the first detecting units 24, and an OR gate 206 with an output port 201 and its inputs connected to the outputs of the gates 202, 203, 204, and 205.

When the automatic reset circuit of the invention is operated at the initial status of the electric system, the inputs 214 and 224 of the first detecting unit 21 and the second detecting unit 22 provide reference voltages such that the outputs 216 and 226 are initially latched at logic LOW level. Similarly, the outputs 236 and 246 of the detecting units 23 and 24 are initially latched at logic HIGH level. Consequently, according the logic levels of the outputs 216, 226, 236, 246 and the logic operation of the decision unit 20, the output port 201 is initially latched at logic LOW level. When noise and disturbance are induced by the ESD or EFT test, or magnetic or electric fields, the voltage-couple devices 211, 221, 231, and 241 filter out the DC-level and low-frequency variations of the supply voltage port 10 and the electric ground 11, and let the transient variations of the supply voltage port 10 and the electric ground 11 pass to the inputs 215, 225, 235, 245 of the detecting units 21, 22, 23, 24, respectively. Disturbed by the transient variations of the supply voltage port 10 and the electric ground 11, the outputs 216 and 226 of the detecting units 21 and 22 are changed and latched at the logic HIGH level. Similarly, the outputs 236 and 246 of the detecting units 23 and 24 are changed and latched at the logic LOW level. The reason of changing the output levels of the detecting units is that the transient variations change the gates' potential in detecting units by discharging or charging the gates through the substrates and wells of the gates. Consequently, according the changed logic levels of the outputs 216, 226, 236, 246 and the logic operation of the decision unit 20, the output port 201 is changed and latched at logic HIGH level. The logic-level variation of the output port 201 from LOW to HIGH enables the automatic reset circuit of the present invention to reset the electric system. Hence, the electric system goes back to the initial status, and the outputs 216 of the first detecting units 21 and the outputs 226 of the second detecting units 22 are changed and latched at logic LOW level. Similarly, the outputs 236 of the third detecting units 23 and the outputs 246 of the forth detecting units 24 are changed and latched at logic HIGH level.

It is noted that the automatic reset circuit for detecting transient voltage variations of an electric system described above are the preferred embodiment of the present invention for the purposes of illustration only, and are not intended as a definition of the limits and scope of the invention disclosed. Any modifications and variations that may be apparent to a person skilled in the art are intended to be included within the scope of the present invention. For example, the NOR gate of the invention is logically equivalent to a series connection of an OR gate and a NOT gate.

What is claimed is:

1. A reset circuit with transient detection function, comprising:

a plurality of detecting units, each of the detecting units including a detect input, a control input, and an output, the output of each detecting unit initially latched at a voltage, the voltage of the output of each detecting unit being able to be changed by the transient variations;

a voltage-couple device connected with the detect input of each of the detecting units, being used to facilitate the transmitting of the transient variations thereto; and a decision unit with an output port, connected with the outputs of the detecting units, the decision unit having the ability to generate a reset enabling signal through the output port according to the outputs' voltages of the detecting units.

2. The reset circuit with transient detection function as recited in claim 1 wherein the voltage-couple device is a capacitor.

3. The reset circuit with transient detection function as recited in claim 1 wherein the terminal of the voltage-couple device apart the detect input of the detecting unit is connected to the supply voltage.

4. The reset circuit with transient detection function as recited in claim 1 wherein the terminal of the voltage-couple device apart the detect input of the detecting unit is connected to the electric ground.

5. The reset circuit with transient detection function as recited in claim 1 wherein the control inputs of the detecting units provide reference voltages to set the voltages of the outputs of the detecting units at logic LOW level.

6. The reset circuit with transient detection function as recited in claim 1 wherein the control inputs of the detecting units provide reference voltages to set the voltages of the outputs of the detecting units at logic HIGH level.

7. The reset circuit with transient detection function as claimed in claim 1 wherein the detecting unit includes a NOR gate and a NOT gate where the input of the NOT gate is connected to the output of the NOR gate, the output of the NOT gate is linked to one of the inputs of the NOR gate, and the NOR gate and the NOT gate are used to latch the voltage of the output of the detecting unit at a logic level.

8. The reset circuit with transient detection function as recited in claim 1 wherein the detecting unit includes a NAND gate and a NOT gate where the input of the NOT gate is connected to the output of the NAND gate, the output of the NOT gate is linked to one of the inputs of the NAND gate, and the NAND gate and the NOT gate are used to latch the voltage of the output of the detecting unit at a logic level.

9. A detect circuit for detecting the transient variations of the supply voltage and the electric ground of an electric system, comprising:

a detect device with a first input, a second input, and an output port, the first input connected with one terminal of a voltage-couple device for facilitating the detection of the transient variations, the voltage of the output port of the detect device being changeable by the transient variations; and a feedback device with an input and an output, the input of the feedback device connected to the output of the detecting device, the output of the feedback device linked to the first input of the detecting device, the feedback device being used to latch the output of the detect device at a voltage;

further wherein the second input of the detect device provide a reference voltage to set the voltage of the output of the detect device at logic LOW level.

10. The detect circuit for detecting the transient variations of the supply voltage and the electric ground of an electric system as recited in claim 9 wherein the voltage-couple device is a capacitor.

11. The detect circuit for detecting the transient variations of the supply voltage and the electric ground of an electric system as recited in claim 9 wherein the second input of the detect device provide a reference voltage to set the voltage of the output of the detect device at logic HIGH level.

12. The detect circuit for detecting the transient variations of the supply voltage and the electric ground of an electric system as recited in claim 9 wherein the terminal of the voltage-couple device apart the first input of the detect device is connected to a supply voltage.

13. The detect circuit for detecting the transient variations of the supply voltage and the electric ground of an electric system as recited in claim 9 wherein the terminal of the voltage-couple device apart the first input of the detect device is connected to the electric ground.

14. The detect circuit for detecting the transient variations of the supply voltage and the electric ground of an electric system as recited in claim 9 wherein the detect device is a NOR gate.

15. The detect circuit for detecting the transient variations of the supply voltage and the electric ground of an electric system as recited in claim 9 wherein the detect device is a series connection of an OR gate and a NOT gate.

16. The detect circuit for detecting the transient variations of the supply voltage and the electric ground of an electric system as recited in claim 9 wherein the detect device is a NAND gate.

17. The detect circuit for detecting the transient variations of the supply voltage and the electric ground of an electric system as recited in claim 9 wherein the detect device is a series connection of an AND gate and a NOT gate.

18. The detect circuit for detecting the transient variations of the supply voltage and the electric ground of an electric system as recited in claim 9 wherein the feedback device is a NOT gate.

* * * * *